(12) United States Patent
Houjou et al.

(10) Patent No.: US 8,480,829 B2
(45) Date of Patent: Jul. 9, 2013

(54) PNEUMATIC TIRE, AND MANUFACTURING METHOD OF THE SAME

(75) Inventors: Masahiroi Houjou, Higashiyamato (JP); Yoshinori Tokuda, Saitama (JP); Shigeki Kamo, Tachikawa (JP)

(73) Assignee: Bridgestone Corporation, Tokyo (JP)

( * ) Notice: Subject to any disclaimer, the term of this patent is extended or adjusted under 35 U.S.C. 154(b) by 1007 days.

(21) Appl. No.: 12/376,261

(22) PCT Filed: Aug. 3, 2007

(86) PCT No.: PCT/JP2007/065283
§ 371 (c)(1),
(2), (4) Date: Jun. 9, 2009

(87) PCT Pub. No.: WO2008/016145
PCT Pub. Date: Feb. 7, 2008

(65) Prior Publication Data
US 2009/0308514 A1  Dec. 17, 2009

(30) Foreign Application Priority Data

Aug. 3, 2006 (JP) ............................... P2006-211814
Aug. 15, 2006 (JP) ............................... P2006-221500

(51) Int. Cl.
*B29D 30/52* (2006.01)

(52) U.S. Cl.
USPC ..................... 156/130.5; 152/209.5; 264/236; 264/485

(58) Field of Classification Search
USPC ............ 264/236, 485; 156/123, 128.1, 128.6, 156/130.5; 152/209.5, 209.1, 905
See application file for complete search history.

(56) References Cited

U.S. PATENT DOCUMENTS

| | | | | |
|---|---|---|---|---|
| 3,959,053 A | * | 5/1976 | Fisk et al. | 156/123 |
| 4,139,405 A | * | 2/1979 | Seiberling | 156/130.5 |
| 4,230,649 A | * | 10/1980 | Bohm et al. | 156/130.5 |
| 5,614,041 A | * | 3/1997 | Dumke et al. | 152/209.5 |
| 5,686,505 A | * | 11/1997 | Kusano et al. | 522/157 |
| 2005/0115653 A1 | * | 6/2005 | Miyasaka et al. | 152/209.1 |

FOREIGN PATENT DOCUMENTS

| | | |
|---|---|---|
| EP | 0 648 623 A1 | 4/1995 |
| EP | 0 978 370 A2 | 2/2000 |
| EP | 1 228 898 A1 | 8/2002 |
| EP | 1632364 A1 * | 3/2006 |
| JP | 53-080602 A * | 7/1978 |
| JP | 61-119409 A | 6/1986 |
| JP | 01-153305 A | 6/1989 |
| JP | 07-001471 A | 1/1995 |
| JP | 07-117411 A | 5/1995 |

(Continued)

OTHER PUBLICATIONS

Machine translation for Japan 2002-079808 (no date).*

(Continued)

*Primary Examiner* — Steven D Maki
(74) *Attorney, Agent, or Firm* — Sughrue Mion, PLLC

(57) ABSTRACT

A 300% modulus at 100° C. in the range of 1 mm in an radial direction from a surface of a tread member is set to be between 1.10 times and 2.0 times inclusive, more preferably, between 1.10 times and 1.5 times inclusive, larger than a 300% modulus at 100° C. in the range of 0.5 mm to 1.5 mm in the radial direction from a bottom part of the tread member.

2 Claims, 2 Drawing Sheets

FOREIGN PATENT DOCUMENTS

| | | | | |
|---|---|---|---|---|
| JP | 09-155884 | A | * | 6/1997 |
| JP | 11-165320 | A | * | 6/1999 |
| JP | 2001-233020 | A | | 8/2001 |
| JP | 2002-059709 | A | * | 2/2002 |
| JP | 2002-079808 | A | | 3/2002 |
| JP | 2002-079808 | A | * | 3/2002 |
| JP | 2007-223481 | A | | 9/2007 |
| WO | 2005/044594 | A1 | | 5/2005 |
| WO | 2005/063508 | A1 | | 7/2005 |
| WO | 2007/049310 | A1 | | 5/2007 |

OTHER PUBLICATIONS

Machine translation for Japan 2002-059709 (no date).*
Machine translation for Japan 11-165320 (no date).*
Machine translation for Japan 09-155884 (no date).*
Supplementary European Search Report issued in European Application No. 07791956.1-2425/2048006 dated Jun. 24, 2010 (8 pages).

* cited by examiner

PNEUMATIC TIRE, AND MANUFACTURING METHOD OF THE SAME

TECHNICAL FIELD

The present invention relates to: a pneumatic tire that is suitable to be used as a tire for passenger vehicles, a studless tire, a racing tire, a tire for buses and trucks, an off-road tire, a tire for two-wheeled vehicles, or the like; and a manufacturing method thereof.

BACKGROUND ART

Heretofore, techniques for improving performance of tires have been proposed, in which a tread member is formed to have a two-layer structure including an outer surface layer and an inner surface layer having different properties. Specifically, a technique for reducing the amount of uneven wear of tires at the early stage of wear and also improving grip performance of the tires at the time of driving on an icy/snowy road has been proposed (see Patent Document 1). In this technique, a tread member is formed to have a two-layer structure in which the degree of hardness of an outer surface layer is higher than that of an inner layer. Further, a technique for improving grip performance of tires at the early stage of driving has been proposed (see Patent Document 2). In this technique, a tread member is formed so that the ratio of the stress of a rubber composition forming an inner surface layer at 300% elongation to the stress of a rubber composition forming an outer surface layer would be 70% or less, that is, the tread member is formed to have a two-layer structure in which the outer surface layer is softer than the inner surface layer.

When a tread member is formed to have a two-layer structure, uniform disposition and insertion of members each having a thickness of 1.5 mm or smaller are required. However, such a technique of uniform disposition and insertion of members having a thickness of 1.5 mm or smaller is extremely difficult from a manufacturing process viewpoint, which prevents manufacture of tire tread members with high productivity. Moreover, when the outer surface layer of the tread member is formed of a member having a low degree of hardness, the outer surface layer and the inner surface layer result in having different rigidities. Therefore, this increases the occurrence of another type of uneven wear in which only hard rubber remains selectively, at the last stage of driving. Furthermore, when the outer surface layer of the tread member is formed of a member having a high degree of hardness, an uneven wear resistance at the early stage of driving is improved while the grip performance of the tire sometimes decreases significantly.

The present invention has been made to solve the above-described problems. An object of the present invention is to provide: a pneumatic tire with excellent productivity that is capable of reducing uneven wear likely to occur at the early stage of wear while maintaining grip performance; and a manufacturing method thereof.

Patent Document 1; Japanese Unexamined Patent Application Publication No. 7-117411
Patent Document 2; Japanese Patent Application Publication No. 2002-079808

DISCLOSURE OF THE INVENTION

As a result of diligent study by the inventors of the present invention, it is found out that a pneumatic tire that is capable of reducing uneven wear likely to occur at the early stage of wear while maintaining grip performance can be manufactured by setting a 300% modulus at 100° C. in the range of 1 mm in an radial direction from a surface of a tread member to be between 1.10 times and 2.0 times inclusive, more preferably, between 1.10 times and 1.5 times inclusive, larger than a 300% modulus at 100° C. in the range of 0.5 mm to 1.5 mm in the radial direction from a bottom part of the tread member. In this description, the "radial direction" means a direction from a surface of a tread member toward a bottom part of the tread member.

Such a pneumatic tire can be manufactured with high productivity, since the tread member does not need to be formed with a two-layer structure. Here, 300% modulus at 100° C. corresponds to a stress of a member that occurs when 300% strain is caused in the member under an atmosphere at a temperature of 100° C. Strain amount to be caused in a member is not limited to 300%, but can be appropriately selected within 100 to 300%.

If the 300% modulus at 100° C. in the range of 1 mm in the radial direction from the surface of the tread member is set to be less than 1.10 times larger than the 300% modulus at 100° C. in the range of 0.5 mm to 1.5 mm in the radial direction from the bottom part of the tread member, the uneven wear of tread member cannot be reduced sufficiently. On the other hand, if the 300% modulus at 100° C. in the range of 1 mm in the radial direction from the surface of the tread member is set to be less than 2.0 times larger than the 300% modulus at 100° C. in the range of 0.5 mm to 1.5 mm in the radial direction from the bottom part of the tread member, the grip performance of the surface of the tread member decreases considerably.

Methods of setting the 300% modulus at 100° C. in the range of 1 mm in the radial direction from the surface of the tread member to be between 1.10 times and 2.0 times larger than the 300% modulus at 100° C. in the range of 0.5 mm to 1.5 mm inclusive in the radial direction from the bottom part of the tread member are, for example: (1) setting the vulcanizing temperature in the range of 1 mm in the radial direction from the surface of the tread member to be higher than that in the range of 0.5 mm to 1.5 mm in the radial direction from the bottom part of the tread member; (2) heating a portion of the tread member only in the range of 1 mm in the radial direction from the surface by a high-temperature warmer, a special vulcanizer, or the like after vulcanization; (3) using a manufacturing method of forming the tread member by winding a ribbon-shaped rubber around, and thus adjusting the amounts of the vulcanization accelerator and sulfur contained in the rubber; (4) selectively irradiating a surface region to be cured, with an electron beam; and (5) attaching a masking sheet onto a surface region not to be cured, and thereafter irradiating the entire surface region with an electron beam, and the like. Here, irradiation of an electron beam can be at any time, for example, after vulcanization or tire formation.

When vulcanization is employed to reduce uneven wear, the modulus of elasticity of the tread member continuously changes in the radial direction. Accordingly, hard rubber remains on the wall surface, and effects of reducing uneven wear can thereby be maintained, even when the surface of the tread member is worn. When irradiation of the entire surface with an electron beam is employed to reduce uneven wear, the groove wall part of the block part is also cured. Accordingly, hard rubber remains on the side wall part of the block part, and effects of reducing uneven wear can thereby be maintained, even when the surface of the tread member is worn. When irradiation of only the side wall part of the block with an electron beam is employed to reduce uneven wear, only the side wall part of the block is made hard from the early stage.

Accordingly, deterioration of the grip performance at the early stage does not occur, and effects of reducing uneven wear can also be maintained The 300% modulus at 100° C. in the range of 1 mm in the radial direction from the surface of the tread member may be set to continuously change toward the bottom part direction. Further, the 300% modulus at 100° C. in the range of 0.5 mm to 1.5 mm in the radial direction from the bottom part of the tread member is desirably set to be within the range of 1.0 MPa to 12 MPa.

BEST MODE FOR CARRYING OUT THE INVENTION

An internal structure of a pneumatic tire of an embodiment of the present invention will be described below with reference to drawings.

[Internal Structure of Pneumatic Tire]

Figure 1:
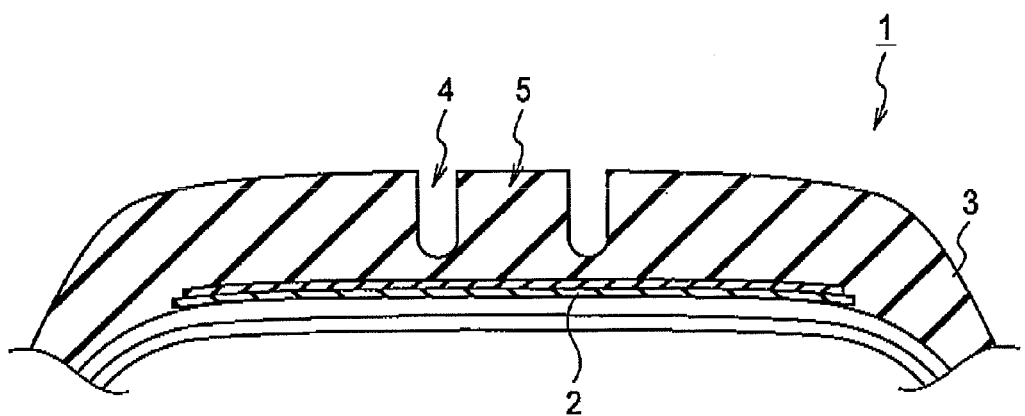
FIG. 1 is a cross-sectional view of an internal structure of a pneumatic tire of an embodiment of the present invention.

As shown in FIG. 1, a pneumatic tire 1 of the embodiment of the present invention includes, as main components: a radial carcass (not illustrated); a belt 2 having high rigidity and disposed to cover a crown part of the radial carcass; and a tread member 3 formed of a rubber composition and disposed around the entire outer peripheral surface of the belt 2. An outer surface of the tread member 3 is formed to be in the shape of an arc-shaped crown, and serves as an outer skin, to have contact with road surface, of the pneumatic tire 1. In the surface of the tread member 3, a tread pattern is formed by sectioning a block part 5 by rib grooves 4 extending in a circumferential direction.

Although not limited to any particular type, the rubber composition used to form the tread member 3 desirably contains at least one kind or more of diene rubber component 90% or more. In addition, a compounding agent such as a reinforcing filler, a process oil, an antioxidant, a vulcanization accelerator, a silane coupling agent, a vulcanization acceleration assistant such as stearic acid or zinc white, a vulcanizing agent such as sulfur, or the like which is generally used in the rubber industry can be mixed into the rubber component appropriately. While carbon black, silica, calcium carbonate or titanium oxide, for example, can be used as the reinforcing filler, the reinforcing filler is desired to be 20 to 150 parts by weight of HAF, ISAF or SAF carbon black with respect to 100 parts by weight of the rubber component used as a raw material. The process oil can be, for example, paraffinic, naphthenic or aromatic process oil.

Although not limited to any particular type, the vulcanization accelerator can be, for example, used: a thiuram type such as tetraoctylthiuram disulfide or tetrabenzylthiuram disulphide, a thiazole type such as mercaptobenzothiazol or dibenzothiazyl disulfide, a sulfenamide type such as N-cyclohexyl-2-dibensothiazyl sulfenamide, N,N'-dicyclohexylbenzothiazyl-2-sulfenamide or N'-t-butyl-2-benzothiazyl sulfenamide, or a diphenylguanidine type. A blending quantity of the vulcanization accelerator is preferably 0.1 to 5 parts by weight with respect to 100 parts by weight of the rubber component. Moreover, a blending quantity of a vulcanizing agent is preferably 0.5 to 5.0 parts by weight with respect to 100 parts by weight of the rubber component.

Figure 2:
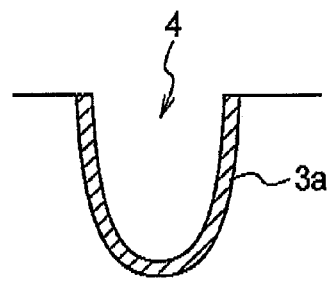
FIG. 2 is an enlarged cross-sectional view of a surface layer of a rib groove shown in FIG. 1.
Figure 3:
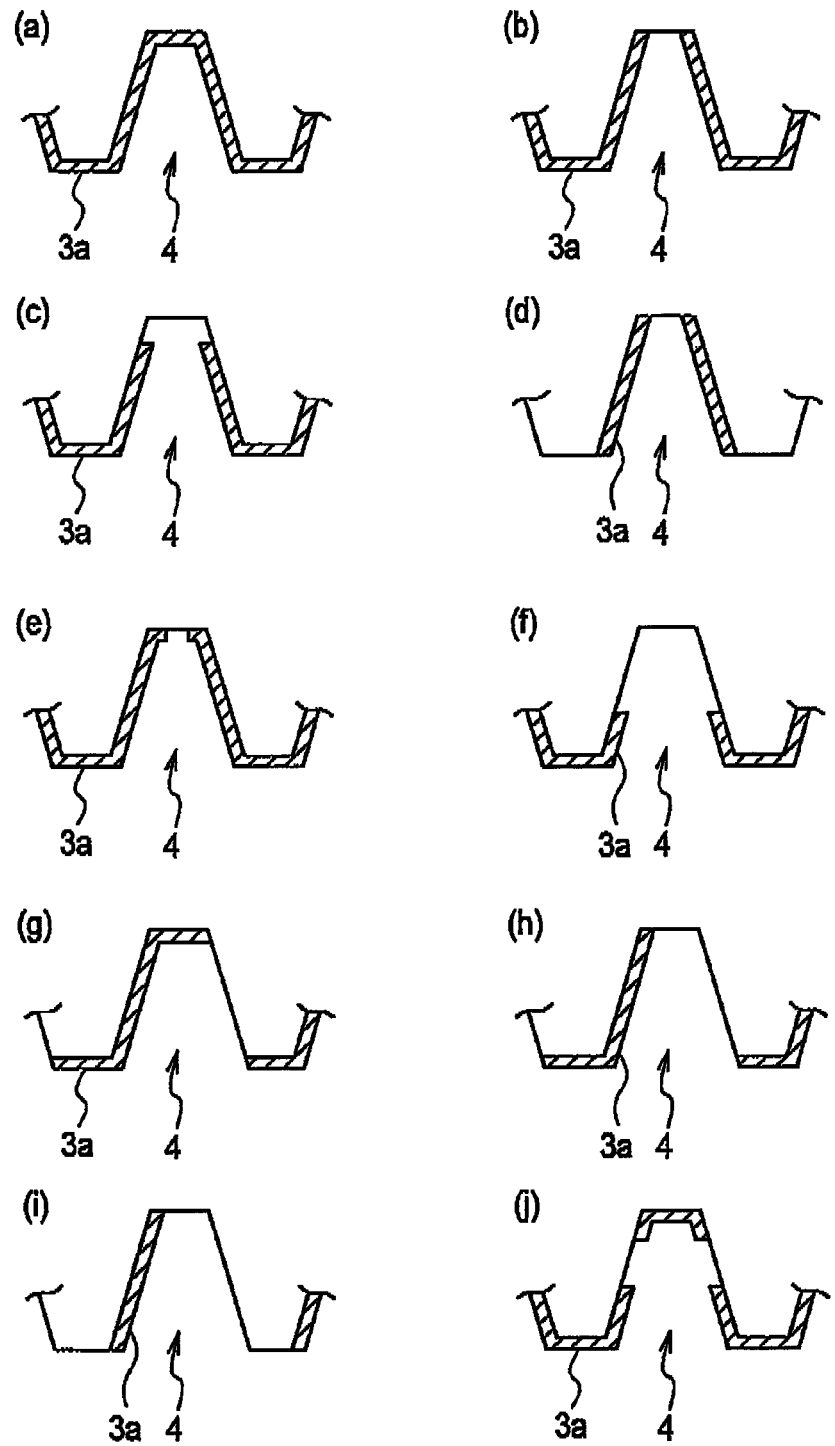
FIG. 3 includes enlarged cross-sectional views of the surface layer of the rib groove shown in FIG. 1.

In this embodiment, a 300% modulus at 100° C. in the range of 1 mm in an radial direction from a surface region 3a of the rib groove 4 shown in FIG. 2 is set to be between 1.10 times and 2.0 times inclusive larger than a 300% modulus at 100° C. in the range of 0.5 mm to 1.5 mm in the radial direction from a bottom part of the tread member 3. Here, a 300% modulus at 100° C. corresponds to a stress that occurs when 300% strain is caused in a sample obtained by slicing off an approximately 1 mm piece from the pneumatic tire 1 in the circumferential direction under an atmosphere at a temperature of 100° C.

If the 300% modulus at 100° C. in the range of 1 mm in the radial direction from the surface of the tread member 3 is set to be less than 1.10 times larger than the 300% modulus at 100° C. in the range of 0.5 mm to 1.5 mm in the radial direction from the bottom part of the tread member 3, uneven wear cannot be reduced sufficiently. On the other hand, if the 300% modulus at 100° C. in the range of 1 mm in the radial direction from the surface of the tread member 3 is set to be more than 2.0 times larger than the 300% modulus at 100° C. in the range of 0.5 mm to 1.5 mm in the radial direction from the bottom part of the tread member 3, the grip performance of the surface of the tread member 3 decreases considerably.

Methods of setting the 300% modulus at 100° C. in the range of 1 mm in the radial direction from the surface of the tread member 3 to be between 1.10 times and 2.0 times larger than the 300% modulus at 100° C. in the range of 0.5 mm to 1.5 mm inclusive in the radial direction from the bottom part of the tread member 3 are, for example: (1) setting the vulcanizing temperature in the range of 1 mm in the radial direction from the surface of the tread member to be higher than that in the range of 0.5 mm to 1.5 mm in the radial direction from the bottom part of the tread member; (2) heating only the range of 1 mm in the radial direction from the surface of the tread member by a high-temperature warmer or the like after vulcanization; (3) using a manufacturing method of forming the tread member by winding a ribbon-shaped rubber around, and thus adjusting the amounts of the vulcanization accelerator and sulfur contained in the rubber; (4) selectively irradiating a surface region to be cured, with an electron beam; and (5) attaching a masking sheet onto a surface region not to be cured, and thereafter irradiating the entire surface region with an electron beam, or the like. Here, irradiation of an electron beam can be at any time, for example, after vulcanization or tire formation.

In this description, as shown in FIGS. 3(a) to (j), the surface layer of the rib groove 4 corresponds to the surface region 3a that is a part of a surface layer, or the entire surface layer, of the tread member 3 excluding the part coming directly in contact with the road surface. From a workability viewpoint, the surface layer of the rib groove 4 is desirably the surface region 3a shown in FIG. 3(a), preferably the surface region 3a shown in any one of FIGS. 3(b) to (e), and more preferably the surface region 3a shown in FIG. 3(b) or (d). When heel-and-toe wear direction is known beforehand, the surface layer of the rib groove 4 may be the surface region 3a shown in any one of FIGS. 3(g) to (i).

EXAMPLES

The pneumatic tire of the present invention will be described below in more detail on the basis of Examples.

Example 1

In Example 1, a rubber A serving as a tread member described in Table 1 below is prepared, and vulcanization is performed under a vulcanization condition γ (tread surface-side average vulcanizing temperature 161° C. and tread bottom-surface-side average vulcanizing temperature 151° C.) shown in Table 4 below. Thereby, 300% moduli at 100° C. in the range of 1 mm in an radial direction from a surface of a tread member, in the range of 1 mm in the middle part, and in the range of 0.5 mm to 1.5 mm in the radial direction from a bottom part are adjusted respectively to 111, 106 and 102, as shown in Tables 2 and 3 below. By using this tread member, a racing tire (size: 225/40R18) of Example 1 is manufactured. Here, the above given values of 300% moduli at 100° C. are relative values when the 300% modulus at 100° C. of the rubber A described in Table 1 is expressed as 100. The middle part here is a part in the middle between the tread surface and the tread bottom part.

Example 2

In Example 2, the same process is performed as in Example 1 except for the following respects: vulcanization is performed under a vulcanization condition δ (tread surface-side average vulcanizing temperature 161° C. and tread bottom-surface-side average vulcanizing temperature 146° C.) shown in Table 4 below; and, thereby, 300% moduli at 100° C. in the range of 1 mm in an radial direction from a surface of a tread member, in the range of 1 mm in the middle part, and in the range of 0.5 mm to 1.5 mm in the radial direction from a bottom part are adjusted respectively to 130, 116 and 104, as shown in Tables 2 and 3 below. Thereby, a racing tire of Example 2 is manufactured. Here, the above given values of 300% moduli at 100° C. are relative values when the 300% modulus at 100° C. of the rubber A described in Table 1 is expressed as 100.

Example 3

In Example 3, the same process is performed as in Example 1 except for the following respects: vulcanization is performed under a vulcanization condition ε (tread surface-side average vulcanizing temperature 171° C. and tread bottom-surface-side average vulcanizing temperature 146° C.) shown in Table 4 below; and, thereby, 300% moduli at 100° C. in the range of 1 mm in an radial direction from a surface of a tread member, in the range of 1 mm in the middle part, and in the range of 0.5 mm to 1.5 mm in the radial direction from a bottom part are adjusted respectively to 150, 131 and 107, as shown in Tables 2 and 3 below. Thereby, a racing tire of Example 3 is manufactured. Here, the above given values of 300% moduli at 100° C. are relative values when the 300% modulus at 100° C. of the rubber A described in Table 1 is expressed as 100.

Comparative Example 1

In Comparative Example 1, the same process is performed as in Example 1 except for the following respects: the vulcanization is performed under a vulcanization condition α (tread surface-side average vulcanizing temperature 151° C. and tread bottom-surface-side average vulcanizing temperature 151° C.) shown in Table 4 below; and, thereby, 300% moduli at 100° C. in the range of 1 mm in an radial direction from a surface of a tread member, in the range of 1 mm in the middle part, and in the range of 0.5 mm to 1.5 mm in the radial direction from a bottom part are all adjusted to the same value (100), as shown in Tables 2 and 3 below. Thereby, a racing tire of Comparative Example 1 is manufactured.

Comparative Example 2

In Comparative Example 2, as a tread member, a rubber having a two-layer structure in which a part in the range of 1 mm in an radial direction from a surface is formed of a rubber B described in Table 1 while the remaining part is formed of the rubber A is prepared, and vulcanization is performed under the vulcanization condition α shown in Table 4. Thereby, 300% moduli at 100° C. in the range of 1 mm in an radial direction from a surface of a tread member, in the range of 1 mm in the middle part, and in the range of 0.5 mm to 1.5 mm in the radial direction from a bottom part are adjusted respectively to 109, 101 and 100, as shown in Tables 2 and 3 below. By using this tread member, a racing tire of Comparative Example 2 is manufactured. Here, the above given values of 300% moduli at 100° C. are relative values when the 300% modulus at 100° C. of the rubber A described in Table 1 is expressed as 100.

Comparative Example 3

In Comparative Example 3, as a tread member, a rubber having a two-layer structure in which a part in the range of 1 mm in an radial direction from a surface is formed of a rubber C described in Table 1 while the remaining part is formed of the rubber A is prepared, and vulcanization is performed under the vulcanization condition α shown in Table 4. Thereby, 300% moduli at 100° C. in the range of 1 mm in an radial direction from a surface of a tread member, in the range of 1 mm in the middle part, and in the range of 0.5 mm to 1.5 mm in the radial direction from a bottom part are adjusted respectively to 120, 100 and 100, as shown in Tables 2 and 3 below. By using this tread member, a racing tire of Comparative Example 3 is manufactured. Here, the above given values of 300% moduli at 100° C. are relative values when the 300% modulus at 100° C. of the rubber A described in Table 1 is expressed as 100.

Comparative Example 4

In Comparative Example 4, the same process is performed as in Example 1 except for the following respects: vulcanization is performed under a vulcanization condition β (tread surface-side average vulcanizing temperature 156° C. and tread bottom-surface-side average vulcanizing temperature 151° C.) shown in Table 4 below; and, thereby, 300% moduli at 100° C. in the range of 1 mm in an radial direction from a surface of a tread member, in the range of 1 mm in the middle part, and in the range of 0.5 mm to 1.5 mm in the radial direction from a bottom part are adjusted respectively to 106, 103 and 101, as shown in Tables 2 and 3 below. Thereby, a racing tire of Comparative Example 4 is manufactured.

Comparative Example 5

In Comparative Example 5, the same process is performed as in Example 1 except for the following respects: vulcanization is performed under a vulcanization condition ξ (tread surface-side average vulcanizing temperature 181° C. and tread bottom-surface-side average vulcanizing temperature 146° C.) shown in Table 4 below; and, thereby, 300% moduli at 100° C. in the range of 1 mm in an radial direction from a surface of a tread member, in the range of 1 mm in the middle part, and in the range of 0.5 mm to 1.5 mm in the radial direction from a bottom part are adjusted respectively to 220, 170 and 115, as shown in Tables 2 and 3 below. Thereby, a racing tire of Comparative Example 5 is manufactured.

TABLE 1

|  | Rubber A | Rubber B | Rubber C | Rubber D |
|---|---|---|---|---|
| SBR (*1) | 150 | 150 | 150 | 150 |
| Carbon black (*2) | 70 | 70 | 70 | 70 |
| Stearic acid | 2 | 2 | 2 | 2 |
| Zinc white | 3 | 3 | 3 | 3 |
| Antioxidant 6C | 1.5 | 1.5 | 1.5 | 1.5 |
| Resin B (*3) | 15 | 15 | 15 | 15 |
| Vulcanization accelerator (DM) (*4) | 1 | 1 | 1 | 1 |
| Vulcanization accelerator (MDM) (*5) | 1 | 1 | 1 | 1 |
| Sulfur | 1 | 1.3 | 1.6 | 3.0 |
| Crosslinking agent (*6) | 2 | 2 | 2 | 3.0 |
| 100° C. M300 | 100 | 110 | 120 | 200 |

(*1) Tufdene 4350 from Asahi Kasei Cooperation (styrene content 39%, amount of vinyl 38%, amount of aromatic oil 50%)
(*2) SAF (N2SA 150 m$^2$/g)
(*3) Alkylphenol resin
(*4) Bis-2-benzothiazolyl sulfide (from Ouchi Shinko Chemical Industrial Co., Ltd.)
(*5) 4,4'-dimethyl-bis-3-benzothiazolyl sulfide
(*6) 1,6-hexamethylenedithio sodium sulfate dihydrate (from Flexsys Inc.)

TABLE 2

| New tire | Tread rubber | Vulcanization condition | 1 mm from surface | 1 mm in tread middle part | 0.5-1.5 mm from tread bottom part | DRY grip performance | Uneven wear resistance |
|---|---|---|---|---|---|---|---|
| Comparative Example 1 | Rubber A only | Vulcanization condition α | 100 | 100 | 100 | 0 | 0 |
| Comparative Example 2 | Rubber B for 1 mm from surface, rubber A for the rest | Vulcanization condition α | 109 | 101 | 100 | −2 | 1 |
| Comparative Example 3 | Rubber C for 1 mm from surface, rubber A for the rest | Vulcanization condition α | 120 | 100 | 100 | −3 | 2 |
| Comparative Example 4 | Rubber A only | Vulcanization condition β | 106 | 103 | 101 | 0 | 2 |
| Comparative Example 5 | Rubber A only | Vulcanization condition ξ | 220 | 170 | 115 | −3 | 3 |
| Example 1 | Rubber A only | Vulcanization condition γ | 111 | 106 | 102 | 0 | 3 |
| Example 2 | Rubber A only | Vulcanization condition δ | 130 | 116 | 104 | −1 | 3 |
| Example 3 | Rubber A only | Vulcanization condition ε | 150 | 131 | 107 | −2 | 3 |

TABLE 3

| Used tire | Tread rubber | Vulcanization condition | 1 mm from surface | 1 mm in tread middle part | 0.5-1.5 mm from tread bottom part | DRY grip performance | Uneven wear resistance |
|---|---|---|---|---|---|---|---|
| Comparative Example 1 | Rubber A only | Vulcanization condition α | 100 | 100 | 100 | 0 | 0 |
| Comparative Example 2 | Rubber B for 1 mm from surface, rubber A for the rest | Vulcanization condition α | 109 | 101 | 100 | 0 | 0 |
| Comparative Example 3 | Rubber C for 1 mm from surface, rubber A for the rest | Vulcanization condition α | 120 | 100 | 100 | 0 | 0 |
| Comparative Example 4 | Rubber A only | Vulcanization condition β | 106 | 103 | 101 | 0 | 0 |
| Comparative Example 5 | Rubber A only | Vulcanization condition ξ | 220 | 170 | 115 | −3 | 3 |
| Example 1 | Rubber A only | Vulcanization condition γ | 111 | 106 | 102 | 0 | 2 |
| Example 2 | Rubber A only | Vulcanization condition δ | 130 | 116 | 104 | 0 | 3 |
| Example 3 | Rubber A only | Vulcanization condition ε | 150 | 131 | 107 | −1 | 3 |

TABLE 4

| | Tread surface temperature | Tread bottom part temperature |
|---|---|---|
| Vulcanization condition α | 151 | 151 |
| Vulcanization condition β | 156 | 151 |
| Vulcanization condition γ | 161 | 151 |
| Vulcanization condition δ | 161 | 146 |
| Vulcanization condition ε | 171 | 146 |
| Vulcanization condition ξ | 181 | 146 |

[Evaluation of Grip Performance]

Racing tires of each of Examples 1 to 3 and Comparative Examples 1 to 5 described above are mounted on a racing vehicle, and the circuit driving of the racing vehicle is performed. Comparative evaluation of test drivers' feelings during the driving is made by using a result of Comparative Example 1 as a standard, to evaluate the DRY grip performance of each of the new and used racing tires. The evaluation results are shown in Tables 2 and 3 above. In the following, a larger positive evaluation value indicates better DRY grip performance.

"+3" ... extent to which general driver who drives not so often can clearly recognize difference "+2" ... extent to which general driver who drives often can clearly recognize difference "+1" ... extent to which professional driver can recognize difference "0" ... control "−1" ... extent to which professional driver can recognize difference "−2" ... extent to which general driver who drives often can clearly recognize difference "−3" ... extent to which general driver who drives not so often can clearly recognize difference

[Evaluation of Uneven Wear Resistance]

Racing tires of each of Examples 1 to 3 and Comparative Examples 1 to 5 described above are mounted on a racing vehicle, and the circuit driving of the racing vehicle is performed. Comparative evaluation of resulting heel-and-toe wear after the driving is made by using a result of Comparative Example 1 as a standard, to evaluate the uneven wear resistance of each of the new and used racing tires. The evaluation results are shown in Tables 2 and 3 above. In the following, a larger positive evaluation value indicates higher uneven wear resistance.

"+3" ... no evidence of heal-and-toe wear is found after driving

"+2" ... extent to which heal-and-toe wear is recognized to be clearly less than control "+1" ... extent to which heal-and-toe wear is recognized to be slightly less than control "0" ... control "−1" ... extent to which heal-and-toe wear is recognized to be slightly more than control "−2" ... extent to which heal-and-toe wear is recognized to be clearly more than control "−3" ... uneven wear hard enough that driver can feel during driving

[Discussion]

As appreciated from Tables 2 and 3, the grip performance of the new racing tires of Example 1 is equal to those of the new racing tires of Comparative Examples 1 and 4, while being higher than those of the new racing tires of Comparative Examples 2, 3 and 5. Moreover, the uneven wear resistance of the new racing tires of Example 1 is equal to that of the new racing tires of Comparative Example 5, while being higher than those of the new racing tires of Comparative Examples 1 to 4.

The grip performance of the used racing tires of Example 1 is equal to those of the used racing tires of Comparative Examples 1 to 4, while being higher than that of the used racing tires of Comparative Example 5. Moreover, the uneven wear resistance of the used racing tires of Example 1 is lower than that of the used racing tires of Comparative Example 5, while being higher than those of the used racing tires of Comparative Examples 1 to 4.

The grip performance of the new racing tires of Example 2 is lower than those of the new racing tires of Comparative Examples 1 and 4, while being higher than those of the new racing tires of Comparative Examples 2, 3 and 5. Moreover, the uneven wear resistance of the new racing tires of Example 2 is equal to that of the new racing tires of Comparative Example 5, while being higher than those of the new racing tires of Comparative Examples 1 to 4.

The grip performance of the used racing tires of Example 2 is equal to those of the used racing tires of Comparative Examples 1 to 4, while being higher than that of the used racing tires of Comparative Example 5. Moreover, the uneven wear resistance of the used racing tires of Example 1 is equal to that of the used racing tires of Comparative Example 5, while being higher than those of the used racing tires of Comparative Examples 1 to 4.

The grip performance of the new racing tires of Example 3 is equal to or lower than those of the new racing tires of Comparative Examples 1, 2 and 4, while being higher than those of the new racing tires of Comparative Examples 3 and 5. Moreover, the uneven wear resistance of the new racing tires of Example 3 is equal to that of the new racing tires of Comparative Example 5, while being higher than those of the new racing tires of Comparative Examples 1 to 4.

The grip performance of the used racing tires of Example 3 is lower than those of the used racing tires of Comparative Examples 1 to 4, while being higher than that of the used racing tires of Comparative Example 5. Moreover, the uneven wear resistance of the used racing tires of Example 3 is equal to that of the used racing tires of Comparative Example 5, while being higher than those of the used racing tires of Comparative Examples 1 to 4.

In sum, it is observed that a pneumatic tire with excellent productivity that is capable of reducing uneven wear likely to occur at the early stage of wear while maintaining grip performance can be manufactured by setting the 300% modulus at 100° C. in the range of 1 mm in the radial direction from the surface of the tread member to be 1.10 times and 2.0 times inclusive larger than the 300% modulus at 100° C. in the range of 0.5 mm to 1.5 mm in the radial direction from the bottom part of the tread member. Moreover, it is also observed that, since the modulus of elasticity of the tread member continuously changes in the radial direction, hard rubber remains on the wall surface, and effects of reducing uneven wear can thereby be maintained, even when the surface of the tread member is worn.

Example 11

In Example 11, a side wall part of each rib groove of a tread member whose 300% modulus at 100° C. is 100 (rubber A described in Table 1) is irradiated with an electron beam by using an apparatus from Nissin-High voltage Co., Ltd. Thereby, the 300% modulus at 100° C. of the side wall part of each rib groove is adjusted to be 110. By using this tread member, a racing tire (size: 225/40 R18) of Example 11 is manufactured.

Example 12

In Example 12, the same process is performed as in Example 11 except that 300% modulus at 100° C. of a side wall part of each rib groove is adjusted to be 150; thereby, a racing tire of Example 12 is manufactured.

Example 13

In Example 13, the same process is performed as in Example 11 except that 300% modulus at 100° C. of a side wall part of each rib groove is adjusted to be 200; thereby, a racing tire of Example 13 is manufactured.

Comparative Example 11

In Comparative Example 11, a racing tire of comparative Example 11 is manufactured by using a tread member whose 300% modulus at 100° C. is 100 (rubber A described in Table 1).

Comparative Example 12

In Comparative Example 12, the same process is performed as in Example 11 except that 300% modulus at 100° C. of a side wall part of each rib groove is adjusted to be 105; thereby, a racing tire of Comparative Example 12 is manufactured.

Comparative Example 13

In Comparative Example 13, a racing tire of comparative Example 13 is manufactured by using a tread member whose 300% modulus at 100° C. is 200 (rubber D described in Table 1).

Comparative Example 14

In Comparative Example 14, the same process is performed as in Example 11 except that 300% modulus at 100° C. of a side wall part of each rib groove is adjusted to be 400; thereby, a racing tire of Comparative Example 14 is manufactured.

[Evaluation of Grip Performance]

Racing tires of each of Examples 11 to 13 and Comparative Examples 11 to 14 described above are mounted on a racing vehicle, and the circuit driving of the racing vehicle is performed. Comparative evaluation of test drivers' feelings during the driving is made by using a result of Comparative Example 11 as a standard, to evaluate the grip performance of each of the new and used racing tires. The evaluation results are shown in Tables 5 and 6 below.

[Evaluation of Uneven Wear Resistance]

Racing tires of each of Examples 11 to 13 and Comparative Examples 11 to 14 described above are mounted on a racing vehicle, and the circuit driving of the racing vehicle is performed. Comparative evaluation of resulting heel-and-toe wear after the driving is made by using a result of Comparative Example 11 as a standard, to evaluate the uneven wear resistance of each of the new and used racing tires. The evaluation results are shown in Tables 5 and 6 below.

TABLE 5

| New tire | Tread rubber | M300 of non-irradiated part | M300 of irradiated part | DRY grip performance | Uneven wear resistance |
|---|---|---|---|---|---|
| Comparative Example 11 | Rubber A only | 100 | 100 | 0 | 0 |
| Comparative Example 12 | Rubber A only | 100 | 105 | 0 | 0 |
| Comparative Example 13 | Rubber D only | 200 | 200 | −2 | 3 |
| Comparative Example 14 | Rubber A only | 100 | 400 | −1 | 3 |
| Example 11 | Rubber A only | 100 | 110 | 0 | 1 |
| Example 12 | Rubber A only | 100 | 150 | 0 | 2 |
| Example 13 | Rubber A only | 100 | 200 | 0 | 3 |

TABLE 6

| Used tire | Tread rubber | M300 of non-irradiated part | M300 of irradiated part | DRY grip performance | Uneven wear resistance |
|---|---|---|---|---|---|
| Comparative Example 11 | Rubber A only | 100 | 100 | 0 | 0 |
| Comparative Example 12 | Rubber A only | 100 | 105 | 0 | 0 |
| Comparative Example 13 | Rubber D only | 200 | 200 | −2 | 3 |
| Comparative Example 14 | Rubber A only | 100 | 400 | −1 | 3 |
| Example 11 | Rubber A only | 100 | 110 | 0 | 1 |
| Example 12 | Rubber A only | 100 | 150 | 0 | 2 |
| Example 13 | Rubber A only | 100 | 200 | 0 | 3 |

[Discussion]

As appreciated from Tables 5 and 6, the grip performance of the new racing tires of Example 11 is equal to those of the new racing tires of Comparative Examples 11 and 12, while being higher than those of the new racing tires of Comparative Examples 13 and 14. Moreover, the uneven wear resistance of the new racing tires of Example 11 is lower than those of the new racing tires of Comparative Examples 13 and 14, while being higher than those of the new racing tires of Comparative Examples 11 and 12.

The grip performance of the used racing tires of Example 11 is equal to those of the used racing tires of Comparative Examples 11 and 12, while being higher than those of the used racing tires of Comparative Examples 13 and 14. Moreover, the uneven wear resistance of the used racing tires of Example 11 is lower than those of the used racing tires of Comparative Examples 13 and 14, while being higher than those of the used racing tires of Comparative Examples 11 and 12.

The grip performance of the new racing tires of Example 12 is equal to those of the new racing tires of Comparative Examples 11 and 12, while being higher than those of the new racing tires of Comparative Examples 13 and 14. Moreover, the uneven wear resistance of the new racing tires of Example 12 is lower than those of the new racing tires of Comparative Examples 13 and 14, while being higher than those of the new racing tires of Comparative Examples 11 and 12.

The grip performance of the used racing tires of Example 12 is equal to those of the used racing tires of Comparative Examples 11 and 12, while being higher than those of the used racing tires of Comparative Examples 13 and 14. Moreover, the uneven wear resistance of the used racing tires of Example 12 is lower than those of the used racing tires of Comparative Examples 13 and 14, while being higher than those of the used racing tires of Comparative Examples 11 and 12.

The grip performance of the new racing tires of Example 13 is equal to those of the new racing tires of Comparative Examples 11 and 12, while being higher than those of the new racing tires of Comparative Examples 13 and 14. Moreover, the uneven wear resistance of the new racing tires of Example 13 is equal to those of the new racing tires of Comparative Examples 13 and 14, while being higher than those of the new racing tires of Comparative Examples 11 and 12.

The grip performance of the used racing tires of Example 13 is equal to those of the used racing tires of Comparative Examples 11 and 12, while being higher than those of the used racing tires of Comparative Examples 13 and 14. Moreover, the uneven wear resistance of the used racing tires of Example 13 is equal to those of the used racing tires of Comparative Examples 13 and 14, while being higher than those of the used racing tires of Comparative Examples 11 and 12.

In sum, it is observed that a pneumatic tire with excellent productivity that is capable of reducing uneven wear likely to occur at the early stage of wear while maintaining grip performance can be manufactured by setting the 300% modulus at 100° C. in the range of 1 mm in the radial direction from the surface of the tread member to be between 1.10 times and 2.0 times inclusive larger than the 300% modulus at 100° C. in the range of 0.5 mm to 1.5 mm in the radial direction from the bottom part of the tread member. Moreover, it is also observed that, when only the side wall part of the block is irradiated with an electron beam to reduce uneven wear, reduction of the grip performance at the early stage does not occur, and effects of reducing uneven wear can also be maintained, since only the side wall part of the block is made hard from the early stage.

Example 14

In Example 14, the entire surface of a tread member whose 300% modulus at 100° C. is 100 (rubber A described in Table 1) is irradiated with an electron beam by using the apparatus from Nissin-High voltage Co., Ltd. Thereby, 300% modulus at 100° C. of the entire surface of the tread member is adjusted to be 110. By using this tread member, a racing tire of Example 14 is manufactured.

Example 15

In Example 15, the same process is performed as in Example 14 except that 300% modulus at 100° C. of the entire surface of a tread member is adjusted to be 150; thereby, a racing tire of Example 15 is manufactured.

Example 16

In Example 16, the same process is performed as in Example 14 except that 300% modulus at 100° C. of the entire surface of a tread member is adjusted to be 200; thereby, a racing tire of Example 16 is manufactured.

Comparative Example 15

In Comparative Example 15, a racing tire of comparative Example 15 is manufactured by using a tread member whose 300% modulus at 100° C. is 100 (rubber A described in Table 1).

Comparative Example 16

In Comparative Example 16, the same process is performed as in Example 14 except that 300% modulus at 100° C. of the entire surface of a tread member is adjusted to be 105; thereby, a racing tire of Comparative Example 16 is manufactured.

Comparative Example 17

In Comparative Example 17, the same process is performed as in Example 14 except that 300% modulus at 100° C. of the entire surface of a tread member is adjusted to be 250; thereby, a racing tire of Comparative Example 17 is manufactured.

Comparative Example 18

In Comparative Example 18, the same process is performed as in Example 14 except that 300% modulus at 100° C. of the entire surface of a tread member is adjusted to be 400; thereby, a racing tire of Comparative Example 18 is manufactured.

[Evaluation of Grip Performance]

Racing tires of each of Examples 14 to 16 and Comparative Examples 15 to 18 described above are mounted on a racing vehicle, and the circuit driving of the racing vehicle is performed. Comparative evaluation of test drivers' feelings during the driving is made by using a result of Comparative Example 15 as a standard, to evaluate the grip performance of each of the new and used racing tires. The evaluation results are shown in Tables 7 and 8 below.

[Evaluation of Uneven Wear Resistance]

Racing tires of each of Examples 14 to 16 and Comparative Examples 15 to 18 described above are mounted on a racing vehicle, and the circuit driving of the racing vehicle is performed. Comparative evaluation of resulting heel-and-toe wear after the driving is made by using a result of Comparative Example 15 as a standard, to evaluate the uneven wear resistance each of the new and used racing tires. The evaluation results are shown in Tables 7 and 8 below.

TABLE 7

| New tire | Tread rubber | M300 of non-irradiated part | M300 of irradiated part | DRY grip performance | Uneven wear resistance |
| --- | --- | --- | --- | --- | --- |
| Comparative Example 15 | Rubber A only | 100 | 100 | 0 | 0 |
| Comparative Example 16 | Rubber A only | 100 | 105 | 0 | 1 |
| Comparative Example 17 | Rubber A only | 100 | 250 | −3 | 3 |
| Comparative Example 18 | Rubber A only | 100 | 400 | −3 | 3 |
| Example 14 | Rubber A only | 100 | 110 | 0 | 1 |
| Example 15 | Rubber A only | 100 | 150 | −1 | 2 |
| Example 16 | Rubber A only | 100 | 200 | −2 | 3 |

TABLE 8

| Used tire | Tread rubber | M300 of non-irradiated part | M300 of irradiated part | DRY grip performance | Uneven wear resistance |
|---|---|---|---|---|---|
| Comparative Example 15 | Rubber A only | 100 | 100 | 0 | 0 |
| Comparative Example 16 | Rubber A only | 100 | 105 | 0 | 0 |
| Comparative Example 17 | Rubber A only | 100 | 250 | 0 | 3 |
| Comparative Example 18 | Rubber A only | 100 | 400 | 0 | 3 |
| Example 14 | Rubber A only | 100 | 110 | 0 | 1 |
| Example 15 | Rubber A only | 100 | 150 | 0 | 2 |
| Example 16 | Rubber A only | 100 | 200 | 0 | 3 |

[Discussion]

As appreciated from Tables 7 and 8, the grip performance of the new racing tires of Example 14 is equal to those of the new racing tires of Comparative Examples 15 and 16, while being higher than those of the new racing tires of Comparative Examples 17 and 18. Moreover, the uneven wear resistance of the new racing tires of Example 14 is equal to or lower than those of the new racing tires of Comparative Examples 16 to 18, while being higher than that of the new racing tires of Comparative Example 15.

The grip performance of the used racing tires of Example 14 is equal to those of the used racing tires of Comparative Examples 15 to 18. Moreover, the uneven wear resistance of the used racing tires of Example 14 is lower than those of the used racing tires of Comparative Examples 17 and 18, while being higher than those of the used racing tires of Comparative Examples 15 and 16.

The grip performance of the new racing tires of Example 15 is lower than those of the new racing tires of Comparative Examples 15 and 16, while being higher than those of the new racing tires of Comparative Examples 17 and 18. Moreover, the uneven wear resistance of the new racing tires of Example 15 is lower than those of the new racing tires of Comparative Examples 17 and 18, while being higher than those of the new racing tires of Comparative Examples 15 and 16.

The grip performance of the used racing tires of Example 15 is equal to those of the used racing tires of Comparative Examples 15 to 18. Moreover, the uneven wear resistance of the used racing tires of Example 15 is lower than those of the used racing tires of Comparative Examples 17 and 18, while being higher than those of the used racing tires of Comparative Examples 15 and 16.

The grip performance of the new racing tires of Example 16 is lower than those of the new racing tires of Comparative Examples 15 and 16, while being higher than those of the new racing tires of Comparative Examples 17 and 18. Moreover, the uneven wear resistance of the new racing tires of Example 16 is equal to those of the new racing tires of Comparative Examples 17 and 18, while being higher than those of the new racing tires of Comparative Examples 15 and 16.

The grip performance of the used racing tires of Example 16 is equal to those of the used racing tires of Comparative Examples 15 to 18. Moreover, the uneven wear resistance of the used racing tires of Example 16 is equal to those of the used racing tires of Comparative Examples 17 and 18, while being higher than those of the used racing tires of Comparative Examples 15 and 16.

In sum, it is observed that a pneumatic tire with excellent productivity that is capable of reducing uneven wear likely to occur at the early stage of wear while maintaining grip performance can be manufactured by setting the 300% modulus at 100° C. in the range of 1 mm in the radial direction from the surface of the tread member to be between 1.10 times and 2.0 times inclusive larger than the 300% modulus at 100° C. in the range of 0.5 mm to 1.5 mm in the radial direction from the bottom part of the tread member. Moreover, it is also observed that, when the entire surface is irradiated with an electron beam to reduce uneven wear, the groove wall part of the block part is also cured. Accordingly, hard rubber remains on the side wall part of the block part, and effects of reducing uneven wear can thereby be maintained, even when the surface of the tread member is worn.

Hereinabove, the embodiment to which the invention made by the inventors is applied has been described. However, the present invention is limited to neither the explanation nor the drawings, constituting a part of the description, according to this embodiment. In other words, it is added that other embodiments, examples and operation techniques conceivable by those skilled in the art on the basis of the above-described embodiment are, of course, all within the scope of the present invention.

INDUSTRIAL APPLICABILITY

The present invention can be applied to tires such as tires for passenger vehicles, studless tires, racing tires, tires for buses and trucks, off-road tires, or tires for motorcycles.

The invention claimed is:

1. A method of manufacturing a pneumatic tire, the method comprising:
vulcanizing the pneumatic tire, wherein a vulcanizing temperature about 1 mm in a radial direction from a surface of a rib groove formed in a single-layer tread member is set to be higher than that in a range of 0.5 mm to 1.5 mm in the radial direction from a bottom part of the single-layer tread member, so that a 300% modulus at 100° C. at about 1 mm in the radial direction from the surface of the rib groove formed in the single-layer tread member is set to be between 1.10 times and 2.0 times inclusive larger than a 300% modulus at 100° C. in the range of 0.5 mm to 1.5 mm in the radial direction from the bottom part of the single-layer tread member.

2. A method of manufacturing a pneumatic tire, the method comprising:
irradiating a surface of a rib groove formed in a single-layer tread member with an electron beam so that a 300% modulus at 100° C. at about 1 mm in a radial direction from a surface of the rib groove formed in the single-layer tread member is set to be between 1.10 times and 2.0 times inclusive larger than a 300% modulus at 100° C. in a range of 0.5 mm to 1.5 mm in the radial direction from a bottom part of the single-layer tread member.

* * * * *